(12) United States Patent
Debril et al.

(10) Patent No.: US 11,471,944 B2
(45) Date of Patent: Oct. 18, 2022

(54) METHOD FOR THE MANUFACTURE OF A COMPLEX COMPONENT AND SEPARATING TOOL

(71) Applicant: Airbus Operations GmbH, Hamburg (DE)

(72) Inventors: Gilles Debril, Hamburg (DE); Thomas Holder, Hamburg (DE); Volker Robrecht, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 234 days.

(21) Appl. No.: 16/884,489

(22) Filed: May 27, 2020

(65) Prior Publication Data
US 2020/0376560 A1   Dec. 3, 2020

(30) Foreign Application Priority Data

May 28, 2019 (DE) .................. 10 2019 207 857.5

(51) Int. Cl.
*B22F 3/24* (2006.01)
*B22F 10/20* (2021.01)
(Continued)

(52) U.S. Cl.
CPC ................ *B22F 3/24* (2013.01); *B22F 10/20* (2021.01); *B22F 2003/244* (2013.01);
(Continued)

(58) Field of Classification Search
CPC ...... B22F 3/24; B22F 10/20; B22F 2003/244; B22F 2003/247; B33Y 80/00; B33Y 40/20
See application file for complete search history.

(56) References Cited

U.S. PATENT DOCUMENTS

| 2016/0202101 A1* | 7/2016 | Sparks ...................... C25F 3/16 73/861.355 |
| 2017/0144381 A1 | 5/2017 | Ott et al. |

(Continued)

FOREIGN PATENT DOCUMENTS

| CN | 108 179 461 A | 6/2018 | |
| CN | 108179461 A * | 6/2018 | ................ B22F 3/24 |

(Continued)

OTHER PUBLICATIONS

Partial European Search Report for Application No. 20171525.7 dated Oct. 19, 2020.

(Continued)

*Primary Examiner* — Mary Ellen Bowman
(74) *Attorney, Agent, or Firm* — Jenkins, Wilson, Taylor & Hunt, P.A.

(57) ABSTRACT

A method for manufacture of a complex component includes construction of the component from a metal material in an additive manufacturing method with at least one cavity segment that has a cavity open on at least one side and defined by an interior surface of the component, formation of an auxiliary electrode during construction of the component, formation of one or a plurality of supporting structures that connect the auxiliary electrode to the interior surface of the component during the construction of the component, electrical insulation of the auxiliary electrode from the interior surface by separating the supporting structures from the interior surface or from the auxiliary electrode, and performance of an electro-polishing of the interior surface in an electrolyte bath by connecting the component and the auxiliary electrode to different poles of an electric voltage source.

18 Claims, 4 Drawing Sheets

(51) Int. Cl.
  *B33Y 80/00* (2015.01)
  *B33Y 40/20* (2020.01)
(52) U.S. Cl.
  CPC ......... *B22F 2003/247* (2013.01); *B33Y 40/20* (2020.01); *B33Y 80/00* (2014.12)

(56) References Cited

U.S. PATENT DOCUMENTS

| | | | |
|---|---|---|---|
| 2017/0225252 A1* | 8/2017 | Illston | ................... B33Y 40/00 |
| 2019/0177872 A1 | 6/2019 | Matt et al. | |
| 2019/0299309 A1* | 10/2019 | Yang | ......................... B22F 5/10 |
| 2020/0338640 A1* | 10/2020 | Zhang | .................... B22F 10/62 |

FOREIGN PATENT DOCUMENTS

| | | |
|---|---|---|
| DE | 10 2016 114 969 A1 | 12/2017 |
| DE | 10 2017 006 205 A1 | 1/2019 |
| DE | 10 2017 117 666 A1 | 2/2019 |
| EP | 3 109 348 A1 | 12/2016 |
| EP | 3 744 445 A3 | 3/2021 |
| WO | WO 2017/218101 A1 | 12/2017 |
| WO | WO-2018102844 A1 * | 6/2018 .............. B22F 10/20 |

OTHER PUBLICATIONS

German Search Report for Application No. 10 2019 207 857.5 dated Jan. 24, 2020.
Extended European Search Report for Application No. 20171525.7 dated Feb. 1, 2021.

* cited by examiner

Detail Z:

Fig. 13

METHOD FOR THE MANUFACTURE OF A COMPLEX COMPONENT AND SEPARATING TOOL

CROSS-REFERENCE TO RELATED APPLICATION

This application claims priority to DE 10 2019 207 857.5 filed May 28, 2019, the entire disclosure of which is incorporated by reference herein.

TECHNICAL FIELD

The disclosure herein relates to a method for the manufacture of a complex component with cavity segments, in particular a method in which an electrode is additively manufactured with the component, and a post-treatment of the surface of the component, for example an electro-polishing method, is carried out. The complex component can, in particular, be a hydraulic assembly with one or a plurality of pipe segments. The disclosure herein further relates to a separating tool, in particular for use with the method according to the disclosure herein.

BACKGROUND

Using additive or generative manufacturing methods, such as for example 3D printing methods, in which a component is constructed in layers from a loose material on the basis of a digitized geometric model of the component, components with complex geometries such as internal hollow spaces or cavities can be manufactured efficiently. In the case of complex components that are manufactured in an additive method from a metal material, a post-treatment of the component is typically carried out to improve the surface quality of an inner and/or outer surface of the component.

The process known as electro-polishing is one possibility for post-treatment of the surface of interior surfaces that define cavities of a complex component, in particular for smoothing the interior surfaces. An electrode is here inserted into the cavity, and the component is immersed, with the electrode, in an electrolyte bath. For smoothing the interior surface, the component and the electrode are connected to an electric voltage source in such a way that the electrode forms a cathode and the component forms an anode. The material is this way anodically removed from the interior surface, and the interior surface thereby smoothed. An electro-polishing method for additively manufactured components is described in, for example, EP 3 109 348 A1.

SUMMARY

The object of the disclosure herein is to provide improved solutions for the manufacture of a complex component.

This object is achieved both by a method and by a tool as disclosed herein.

Advantageous designs and developments are disclosed herein.

According to a first aspect of the disclosure herein, a method is provided for the manufacture of a complex component. The method comprises a construction of the component from a metal material in an additive manufacturing method with at least one cavity segment that has a cavity open on at least one side and defined by an interior surface of the component, a formation of an auxiliary electrode during the construction of the component, for example of the same metal material as the component or of another conductive material, in general of an electrode metal material, a formation of one or a plurality of supporting structures that connect the auxiliary electrode to the interior surface of the component during the construction of the component, for example of the same metal material as the component or of another material, in general of a supporting structure material, an electrical insulation of the auxiliary electrode from the interior surface by separating the supporting structures from the interior surface or from the auxiliary electrode, and a performance of an electro-polishing of the interior surface in an electrolyte bath by connecting the component and the auxiliary electrode to different poles of an electric voltage source in such a way that the auxiliary electrode forms a cathode and the component forms an anode.

According to this aspect of the disclosure herein, a complex component is first constructed in layers from a metal material in an additive manufacturing method, for example in a 3D printing method, where the component comprises at least one cavity defined by an interior surface, wherein the interior surface further defines at least one opening through which the cavity is accessible. The component can, for example, be a hydraulic assembly, wherein the cavity segment that comprises the cavity can be formed for example by a tube segment.

During the construction of walls that define the component, an auxiliary electrode, e.g. in the form of an elongated, cylindrical segment, is formed in the cavity segment by the additive manufacturing method. Put simply, the auxiliary electrode is printed at the same time. In order to maintain the auxiliary electrode at a predetermined distance from the interior surface of the component, at least one supporting element or a supporting structure, e.g. in the form of a bar or a bridge that extends between the interior surface and the auxiliary electrode, is also formed during the additive manufacture of the component. A plurality of supporting structures, spaced apart from one another along a circumference of the auxiliary electrode, can also be provided. The auxiliary electrode, the supporting structure and the component are thus manufactured as a single piece or single part. The at least one supporting structure is advantageously arranged in the region of the opening of the hollow space, whereby it is easily accessible.

After the construction of the component with the auxiliary electrode and the at least one supporting structure, the at least one supporting structure is mechanically separated, for example being cut through or broken through. The auxiliary electrode is in this way electrically insulated from the interior surface and thus from the component. An electro-polishing of the interior surface is carried out in a further step. The auxiliary electrode and the component are arranged for this purpose in an electrolytic fluid and connected to an electric voltage source, preferably a DC voltage source, wherein the auxiliary electrode serves as a cathode and the component as the anode. Metal material, in particular projections, are removed from the anode as a result, and the surface roughness of the interior surface is thus reduced. The electro-polishing can, for example, also be carried out in combination with plasma-electrolytic or electrochemical surface treatment.

One idea on which this aspect of the disclosure herein is based is that an auxiliary electrode that is used for electro-polishing during the manufacture of the component in an additive manufacturing method is formed at the same time. The auxiliary electrode can thus be arranged without difficulty in complicated, undercut hollow spaces that otherwise would only be accessible from outside with difficulty if at all. A further advantage is that the electrode is easily positioned by the supporting structures that are provided at a desired distance from the interior surface, whereby the electro-polishing can be carried out with improved efficiency and quality. A further advantage is that the geometry of the auxiliary electrode (such as the diameter, cross-section area or material thickness), can be varied and printed at a desired distance from the interior surface, whereby the electro-polishing can be carried out with improved efficiency and quality.

According to one form of embodiment of the method it is provided that the electrical insulation comprises an insertion of a separating head of a separating tool into an opening, defined by the interior surface, of the cavity along the auxiliary electrode, wherein the separating head has an interior circumferential surface that defines and encloses a longitudinal axis and, oriented opposite to this, an exterior circumferential surface, and a cutting through of the one or plurality of supporting structures with a separating segment of the separating head which, with reference to the longitudinal axis, forms a front end of the separating head, wherein the separating head is inserted into the opening sufficiently far that the supporting structures lie against an electrically insulating material forming, at least in segments, the interior circumferential surface and/or the exterior circumferential surface with reference to the longitudinal axis. Accordingly, a separating head, in particular in the form of a hollow cylinder, for example in the form of a circular hollow cylinder, is inserted into the opening and moved against the supporting structures in order to cut through them. This offers the advantage that in some cases all the supporting structures can be cut through together in a single working step. The separating head further comprises an electrically insulating region at an interior circumferential surface that defines the hollow cylindrical form and that faces toward the auxiliary electrode when the separating head is in the state that is inserted into the opening, and/or at an exterior circumferential surface that faces the interior surface of the component when the separating head is in the state that is inserted into the opening, wherein the region preferably extends around the full circumference of the separating head and at least with a certain length along the longitudinal axis of the separating head. When cutting through the at least one supporting structure, the separating head is inserted into the opening sufficiently far that the supporting structure lies within the electrically insulating region with reference to the longitudinal axis. The at least one supporting structure is thus mechanically cut through by the separating head, and the separating head simultaneously forms an electrical insulation.

According to one further form of embodiment, the component is designed with at least two supporting structures spaced apart along a circumference of the auxiliary electrode, and wherein the exterior circumferential surface of the separating head lies against the interior surface of the component when separating the supporting structures, and the separating head remains arranged in the cavity during the electro-polishing. At least two supporting rods or supporting bridges that extend between the interior surface and the circumferential surface of the auxiliary electrode are accordingly formed during the construction of the component. The exterior circumferential surface of the separating head is designed with a diameter that corresponds to the diameter of the opening of the cavity, and is pushed into the cavity through the opening, whereby the supporting bridges in the region of the interior surface are separated therefrom, and lie against the interior circumferential surface of the separating head. Since a plurality of supporting structures are provided spaced along the circumference of the electrode, the supporting structures continue to reliably hold the auxiliary electrode at a predetermined distance from the interior surface of the component for as long as the separating head is inserted in the opening. The separating head can thus, for example, remain in the opening during the electro-polishing, and hereby advantageously holds the auxiliary electrode in position.

According to a further form of embodiment, it is provided that the interior circumferential surface of the separating head lies against a circumferential surface of the auxiliary electrode when separating the supporting structures, and the separating head remains arranged in the cavity during the electro-polishing. In the region of the auxiliary electrode, the at least one supporting structure is accordingly separated therefrom when the separating head is inserted into the cavity through the opening. In particular, the auxiliary electrode is accommodated in an accommodating space defined by the interior circumferential surface of the separating head through the insertion of the separating head into the opening. The auxiliary electrode can, for example, come into contact with the interior circumferential surface of the separating head. Through the accommodation of the auxiliary electrode in the accommodating space defined by the interior circumferential surface of the separating head, it can continue to be held reliably at a predetermined distance from the interior surface of the component by the separating head, as long as the separating head is inserted in the opening or the cavity. The separating head can thus, for example, remain in the opening during the electro-polishing, and hereby advantageously holds the auxiliary electrode in position.

According to one form of embodiment, the separating head can be rotated about the longitudinal axis during separation of the supporting structures. The separating head can, in particular, be inserted into the opening in a combined translation and rotation movement. As a result, shear forces are applied by the separating head to the at least one supporting structure or the at least one supporting element, whereby this is easier to cut through.

According to a further form of embodiment, the supporting structures are formed in a first end segment that is connected to the interior surface of the component with local predetermined breaking points for separating the supporting structures from the interior surface such as, for example, notches. At least one taper or narrowing of the diameter can accordingly be formed at a respective supporting element in the region of the interior surface of the component. This advantageously simplifies the separation of the respective supporting structure from the interior surface.

According to a further form of embodiment, the supporting structures are formed in a second end segment that is connected to the auxiliary electrode with local predetermined breaking points such as, for example, notches, for separating the supporting structures from the auxiliary electrode. At least one taper or narrowing of the diameter can accordingly be formed at a respective supporting element in the region of the circumferential surface of the auxiliary electrode. This advantageously simplifies the separation of the respective supporting structure from the interior surface.

According to a further form of embodiment of the method, a removal of the auxiliary electrode from the cavity of the cavity segment is also provided. The removal is carried out after the electro-polishing. It can, for example, be provided that the auxiliary electrode is withdrawn through the opening of the cavity after the electro-polishing of the interior surface. In appropriate cases, the separating head is first removed from the opening. Optionally, the supporting elements are also removed from the cavity. If the supporting elements are separated in the region of the interior surface of the component, for example by the separating head which lies with the exterior circumferential surface against the interior surface, the auxiliary electrode and supporting structures can advantageously be removed from the cavity together, or as one piece.

According to a further form of embodiment, the component is constructed with a first cavity segment and a second cavity segment connected to this, wherein the auxiliary electrodes of the first and of the cavity segment are designed as one piece and with a predetermined breaking point in a connecting region of the auxiliary electrodes, and wherein the auxiliary electrodes are separated from one another on removal from the cavities of the cavity segments at the predetermined breaking point which can, for example, be implemented in the form of a notch of the electrode. The first cavity segment can, for example, comprise a cavity extending in a first direction, and the second cavity section can comprise a cavity extending in a second direction that is connected to the first cavity. Auxiliary electrodes are accordingly provided in both cavities, wherein the auxiliary electrode of the first cavity segment extends in the first direction and the auxiliary electrode of the second cavity segment in the second direction. In order to simplify a withdrawal of the auxiliary electrodes from both the first and the second direction, a constriction or a notch can be provided as a predetermined breaking point at a crossing point at which the electrodes are connected.

According to a second aspect of the disclosure herein, a separating tool is provided. The separating tool can, in particular, be used in a method according to the first aspect of the disclosure herein for separating the at least one supporting structure during the step of the electrical insulation. The features and advantages disclosed in connection with the first aspect of the disclosure herein thus apply also to the separating tool according to the second aspect of the disclosure herein, and vice versa.

The separating tool comprises a separating head with an interior circumferential surface that defines and encloses a longitudinal axis, and an exterior circumferential surface that is oriented in opposition to this. The separating head has a separating segment which forms a front end of the separating head with reference to the longitudinal axis, wherein the interior circumferential surface and/or the exterior circumferential surface of the separating head is formed, at least in segments with reference to the longitudinal axis, of an electrically insulating material.

The separating head thus has the form of a sleeve or of a hollow cylinder that defines a longitudinal axis. A separating segment that is configured to cut through the metal supporting structures is formed at a first, front end of the separating head. The separating head is, further, designed to be electrically insulating at least in regions. The separating head can accordingly be formed to be electrically insulating along the whole of the longitudinal axis or only in a discrete region. Preferably the electrically insulating region includes the whole of the longitudinal axis. In particular, at least the exterior circumferential surface or at least the interior circumference surface or both surfaces can have electrically insulating properties in regions.

An idea underlying this aspect of the disclosure herein is that of forming a separating tool with a separating head that has electrically insulating properties in regions. This can, for example, as described above, be used for cutting through supporting elements that are manufactured as one piece with a complex component and an auxiliary electrode. This design simplifies an electrical insulation of the auxiliary electrode from the component. At the same time, the separating head can advantageously be used for fixing the auxiliary electrode relative to the component.

According to one form of embodiment of the separating tool, it is provided that the separating head is itself, at least in segments with reference to the longitudinal axis, formed of the electrically insulating material. The separating head can, for example, be formed entirely or at least partially of a plastic material, e.g. a polymer. In particular, a cross-section between the interior circumferential surface and the exterior circumferential surface of the separating head can be formed of an electrically insulating material.

According to a further form of embodiment, it can be provided that the interior circumferential surface and/or the exterior circumferential surface is coated with the electrically insulating material at least in segments with reference to the longitudinal axis. The carrier head can accordingly itself be formed of an insulating or of a non-insulating material, for example a metal material, and only the interior circumferential surface and/or the exterior circumferential surface are at least partially provided with a layer of electrically insulating material, for example a plastic material. This offers the advantage that the carrier head can be formed of a mechanically robust material, while the insulation layer provides the electrical insulation.

According to a further form of embodiment, the separating segment comprises a separating structure, in particular in the form of sawteeth, cutting burrs or the like. This advantageously simplifies cutting through the supporting structures.

According to a further form of embodiment it is provided that the separating head comprises at least one passage opening for passing through electrolytic fluid in the region of a rear end which, with reference to the longitudinal axis, is located in opposition to the front end. A flow of fluid from the interior circumferential surface to the exterior circumferential surface is thereby enabled. This is in particular advantageous if the separating head remains in the opening of the cavity of the component during the electro-polishing, since in this way the electrolytic fluid can be circulated better, which has a positive effect on the surface quality of the component. The larger is the flow surface defined by the passage openings, the more effectively the circulation of the electrolytic fluid is improved, and the efficiency of the electro-polishing is accordingly better.

The at least one passage opening can optionally extend along the longitudinal axis. The passage opening is accordingly designed as a longitudinal recess, extending along the longitudinal axis, between the interior circumferential surface and the exterior circumferential surface of the separating head.

As a further option, the at least one passage opening extends into an end plate forming the rear end of the separating head. The separating head accordingly comprises an end plate which is located, with reference to the longitudinal axis, in opposition to the separating segment. The end plate comprises at least one passage opening. This passage opening can preferably merge into a longitudinal passage opening.

According to a further form of embodiment, the separating tool additionally comprises a coupling for mechanically connecting the separating tool to a drive apparatus, wherein the coupling is connected to a rear end of the separating head which, with reference to the longitudinal axis, is located opposite to the front end. The coupling can, for example, be realized in the form of a shaft or a spigot that stands up from the end plate concentrically with the longitudinal axis.

With reference to direction statements and axes, in particular to direction statements and axes that relate to the route of physical structures, a route of an axis, a direction or a structure "along" another axis, direction or structure here means that these, in particular the tangents arising at a respective location of the structures, each extend at an angle of less than or equal to 45 degrees, preferably less than or equal to 30 degrees, and particularly preferably parallel to one another.

With reference to direction statements and axes, in particular to direction statements and axes that relate to the route of physical structures, a route of an axis, a direction or a structure "across" another axis, direction or structure here means that these, in particular the tangents arising at a respective location of the structures, each extend at an angle of more than 45 degrees, preferably more than 60 degrees, and particularly preferably perpendicular to one another.

BRIEF DESCRIPTION OF THE DRAWINGS

The disclosure herein is explained below with reference to the figures of the drawings. In the figures.

The same reference signs in the figures identify components that are identical or identical in function, unless otherwise stated.

DETAILED DESCRIPTION

Figure 1:
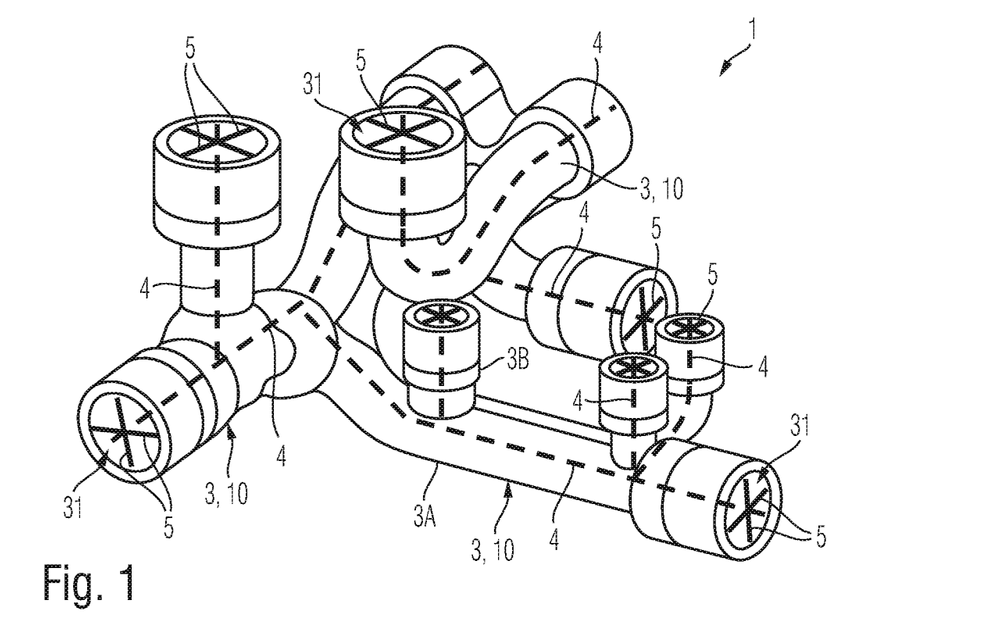
FIG. 1 shows a perspective view of a complex component during a method according to one exemplary embodiment of the disclosure herein.

FIG. 1 shows, by way of example, a complex component 1 in the form of a hydraulic assembly that is assembled from a plurality of pipe segments 10. The pipe segments 10 each form, speaking generally, cavity segments 3, wherein each cavity segment 3 has an open cavity 30. As can be seen in FIG. 1, each pipe segment 10, or each cavity segment 3, has at least one opening 31 that forms of opening of the cavity 30. The hydraulic assembly illustrated in FIG. 1 with cavity segments 3 formed by pipe segments 10 is purely exemplary. A cavity 30 of a cavity segment 3 can, for example, also be designed as a drop-shaped cavity or as a blind-hole cavity or in general as a hollow space. An interior surface 1a of the component 1 thus in general defines a cavity 30 open on at least one side.

FIG. 1 shows by way of example that auxiliary electrodes 4 are arranged in the cavities 30. The auxiliary electrodes 4 are used to carry out an electro-polishing of an interior surface 1a of the component 1, and can subsequently be removed. In FIG. 1 the component 1 is thus shown before finishing, i.e. during a manufacturing method that is explained below in detail.

Figure 2:
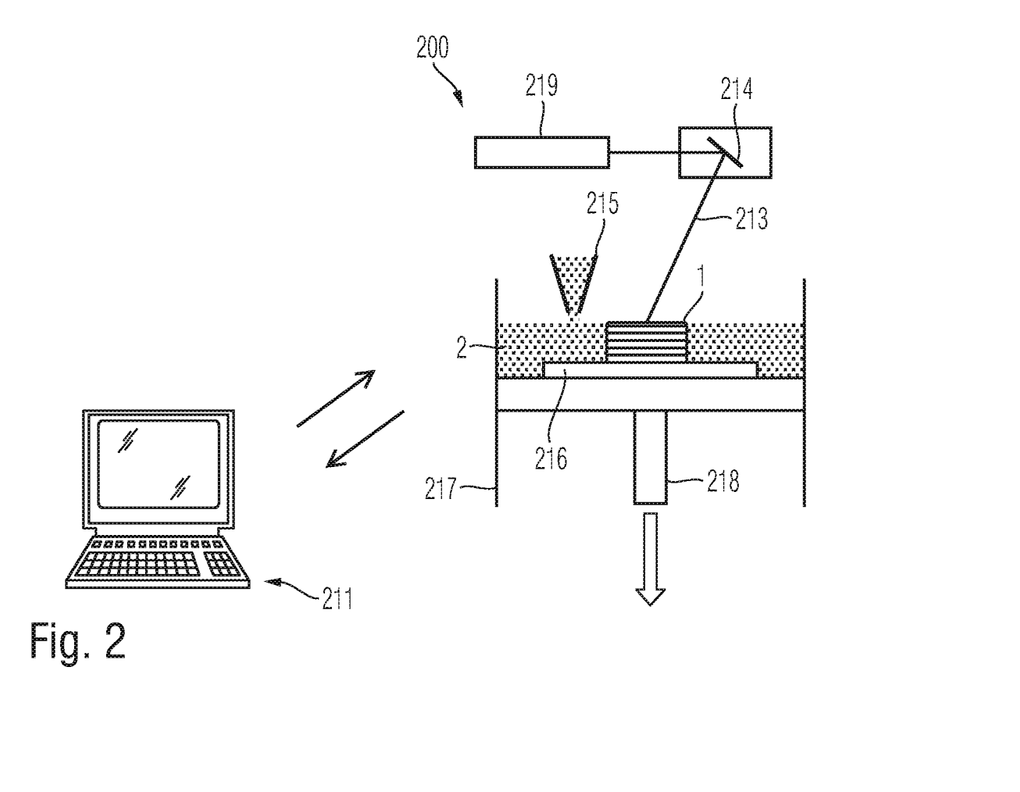
FIG. 2 shows a schematic view of a construction of the component by an additive manufacturing method according to one exemplary embodiment of the disclosure herein.

FIG. 2 shows by way of example a step of the method in which the component 1, the auxiliary electrode 4 and a supporting structure or supporting elements 5 are constructed in an additive manufacturing method. The component 1, the auxiliary electrode 4 and the at least one supporting structure or the at least one supporting element 5 can, for example, be constructed of a metal material 2, for example of the same metal material 2. It is also conceivable that only the component 1 and the auxiliary electrode 4 are constructed of a metal material 2, for example the same or different, in general electrically conductive metal materials. The supporting element 5 can also be constructed from a non-conductive material.

For the additive construction of the component 1, the auxiliary electrode 4 and the supporting elements 5, the modelling material 2, for example the metal material or different metal or plastic materials, is supplied to a 3D printing apparatus 200, as is shown in FIG. 2. The modelling material 2 can, for example, be present in powder form for this purpose. In principle, the disclosure herein allows for a wide range of possibilities for liquefaction of the modelling material 2 in which heat can be introduced at specific localities in the deposited modelling material 2. The use of lasers and/or particle beams, e.g. electron beams, is in particular advantageous, since in this way heat can be generated in a highly targeted and controlled manner. The additive construction or production can thus, for example, be chosen from the group of selective laser sintering, selective laser melting, selective electron-beam sintering and selective electron-beam melting or the like. Fundamentally, however, any desired additive method can be used, for example a directed energy deposition (DED) method. Additive construction is explained below by way of example in connection with selective laser melting (SLM), wherein the modelling material 2 is applied in powder form to a working platform 216 and is liquefied in specific locations through laser irradiation with a laser beam 213, whereby, after cooling the cohering component 1 results, including the auxiliary electrode 4 and supporting elements 5.

An energy source in the form of a laser to 19, for example an Nd:YAG laser, transmits a laser beam 213 to a selected location on a specific part of a powder surface of the powdery modelling material 2 which lies on the working platform 216 in a working chamber 217. An optical deflection apparatus or a scanner module such as, perhaps, a movable or tilting mirror 214 that deflects the laser beam 213 to a specific part of the powder surface of the modelling material 2 in accordance with its tilted position, can be provided for this purpose. The modelling material 2, here in the form of a metal powder, is heated at the point where the laser beam 213 impinges, so that the powder particles are locally fused together, forming an agglomerate when cooled. The laser been 213 scans the powder surface depending on a digital model of the component 1 that is provided, for example, by a computer 211, with the auxiliary electrode 4 and the supporting structure 5. After the selective melting and local agglomeration of the powder particles in the surface layer of the modelling material 2, excess modelling material 2 that has not been agglomerated can be discarded. The working platform 216 is then lowered by a lowering piston 218 (see arrow in FIG. 2), and new modelling material 2 is transferred from a reservoir into the working chamber 217 with the aid of a powder feed 215 or other suitable apparatus. In this way a three-dimensionally sintered or "printed" component 1 made of agglomerated metal material 2 emerges in an iterative, generative construction process. The surrounding powdery modelling material 2 can here serve to support the part of the component 1 constructed so far. Through the continuous downward movement of the working platform 216, the component, together with the auxiliary electrode 4 and the supporting elements 5, emerge in a layered model generation process.

Figure 3:
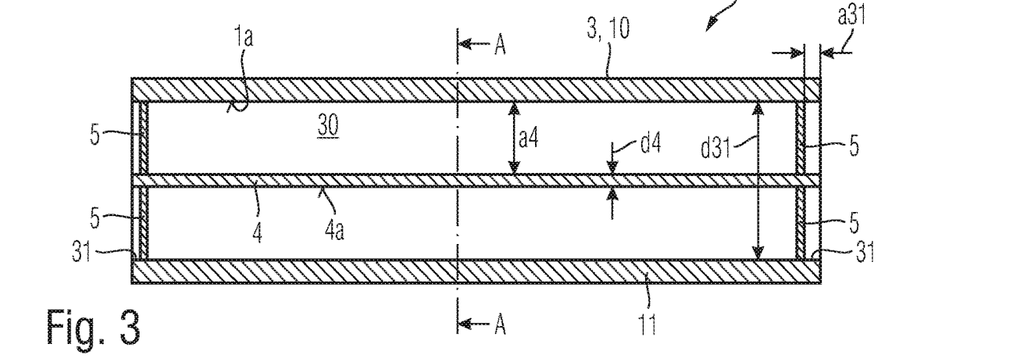
FIG. 3 shows a schematic sectional view of a complex component during a method according to one exemplary embodiment of the disclosure herein.
Figure 4:
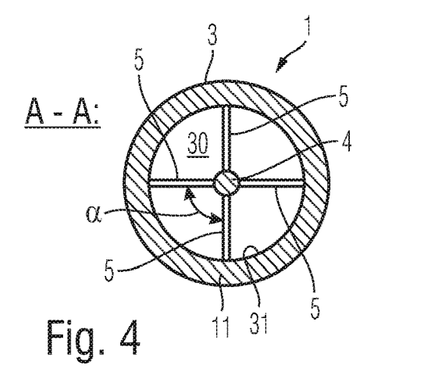
FIG. 4 shows a further schematic sectional view of the component resulting from a cut along the line A-A drawn in FIG. 3.

FIG. 3 shows schematically, and purely by way of example, a sectional view of a cavity segment 3 of the component 1 that is constructed in the additive manufacturing method. FIG. 4 shows a sectional view of the component 1 illustrated in FIG. 3 resulting from a cut along the line A-A illustrated in FIG. 3. The cavity segment 3 comprises a cavity 30 that is defined by an interior surface 1a of walls 11 of the component 1 formed from the metal material 2. In FIG. 3, the cavity segment 3 is designed, by way of example, as a pipe segment 10. The interior surface 1a thus defines a cavity 30 extending longitudinally that has openings 31 at opposing sides. As is illustrated purely by way of example in FIG. 4, the interior surface 1a can define a circular cross-section. Other forms of the cavity 30 are, of course, also conceivable, for example having a curved longitudinal extension, with rectangular or polygonal cross-sections or the like. In general, a construction of the component 1 takes place with at least one cavity segment 3 that comprises a cavity 30 that is open at at least one opening 31 and is defined by the interior surface 1a of the component 1.

As is further illustrated in FIG. 3 and already referred to above, in the additive construction of the component 1, an auxiliary electrode 4 of an electrically conductive electrode material, for example of the metal material 2 and that extends in the cavity 30, is constructed or printed at the same time. The auxiliary electrode 4 can, for example, be designed as a rod-like, elongated element which extends from the at least one opening 31 of the cavity 30 into the cavity 30. FIG. 3 shows by way of example that the auxiliary electrode 30 extends between the opposing openings 31 of the cavity 30. As can be seen in FIG. 1, the auxiliary electrode 4 can, for example, be designed in such a way that it runs along a longitudinal extension of the cavity 30. The auxiliary electrode 4 can, for example, be formed with a predetermined distance a4 from the interior surface 1a of the component 1, as is shown schematically in FIG. 3. The auxiliary electrode 4 can, for example, have a circular cross-section, as is illustrated by way of example in FIG. 4. Other cross-sectional forms are, of course, also conceivable. A diameter d4 of the auxiliary electrode 4 can, for example, lie in a range between 5 mm and 10 mm.

Figure 12:
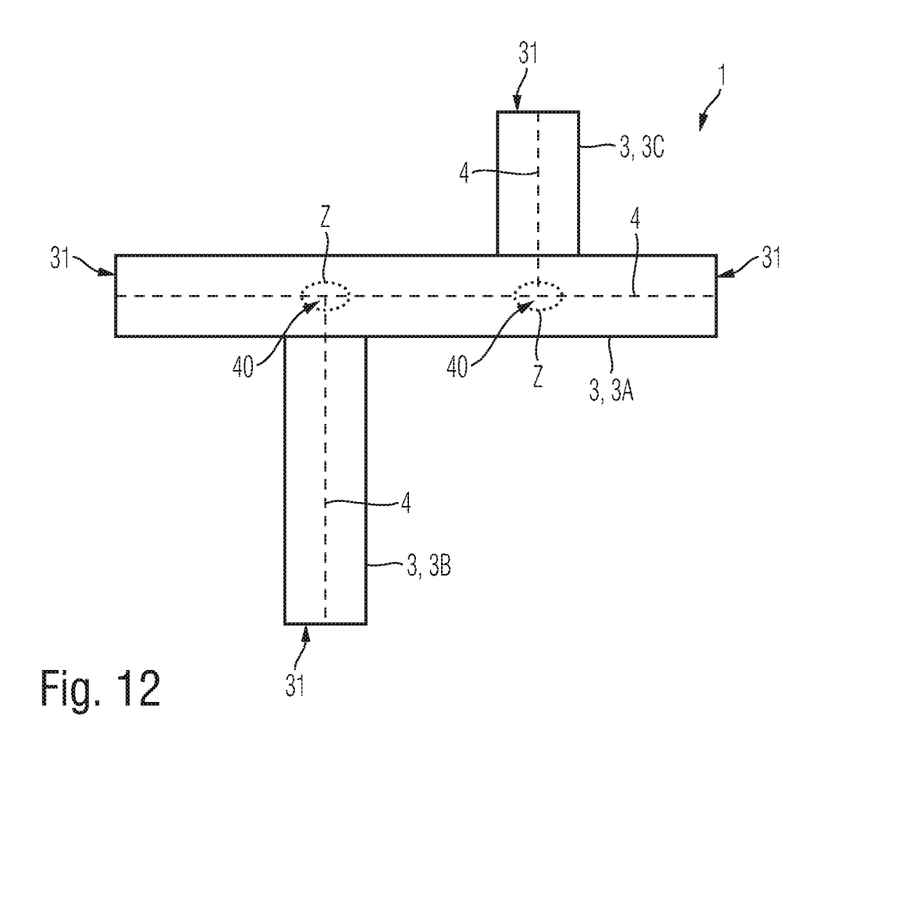
FIG. 12 shows a schematic plan view of a complex component in a method according to one further exemplary embodiment of the disclosure herein.
Figure 13:
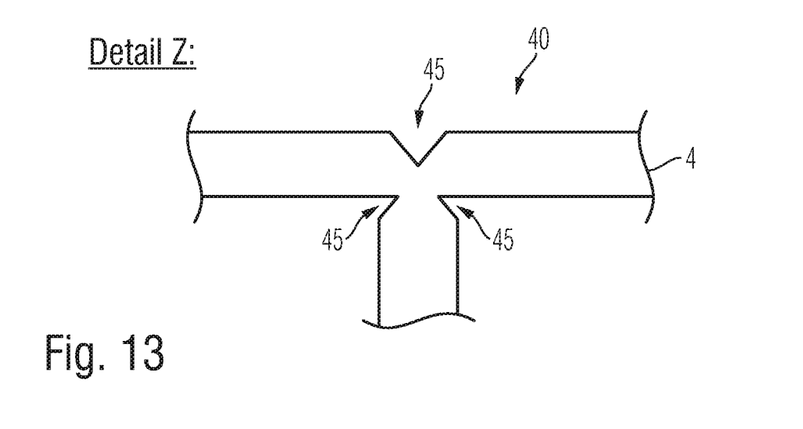
FIG. 13 shows a detailed view of the region identified by the letter Z in FIG. 12.

FIG. 12 illustrates by way of example a plan view of a component 1 that has a first cavity segment 3A, a second cavity segment 3B and a third cavity segment 3C. The component 1 can, in general, have at least one cavity segment 3. As is illustrated by way of example in FIG. 12, the second and the third cavity segments 3B, 3C can each be designed as tubes and are each connected to the first cavity segment 3A, wherein the cavities 30 of the individual cavity segments 3A, 3B, 3C merge into one another. An auxiliary electrode 4 is constructed here in each of the cavity segments 3A, 3B, 3C, independently of their number. The auxiliary electrodes 4 of the individual cavity segments 3A, 3B, 3C are connected to one another, or are designed as one piece during the additive construction of the component 1. FIG. 13 shows schematically a connecting region 40 in which the auxiliary electrodes 4 of different cavity segments 3A, 3B, 3C are joined to one another or branch off one another. As is shown by way of example in FIG. 13, the auxiliary electrodes can be designed in the connecting region 40 with one or a plurality of notches 45 that serve as predetermined breaking points of the electrode 4.

To position the auxiliary electrode 4 in a fixed location relative to the interior surface 1a of the component 1, one or a plurality of supporting structures or supporting elements 5 are created additively from a supporting structure material, e.g. from the metal material 2, during the additive construction of the component 1. At least one supporting element 5 is, in general, generated, wherein, for reasons of clarity, reference will be made below to "the supporting elements 5". The supporting elements 5 are designed as rod-shaped structures which extend between the auxiliary electrode 4, in particular a circumferential surface 4a of the auxiliary electrode 4 that defines the cross-section of the auxiliary electrode 4 and the interior surface 1a of the component 1, as is illustrated in FIGS. 3 and 4, schematically in each case. The supporting elements 5 thus connect the interior surface 1a and the auxiliary electrode 4. The component 1, the auxiliary electrode 4 and the supporting elements 5 are thus manufactured as one piece. A diameter d5 of the supporting elements 5 can, for example, lie in a range between 2 mm and 5 mm.

Figure 5:
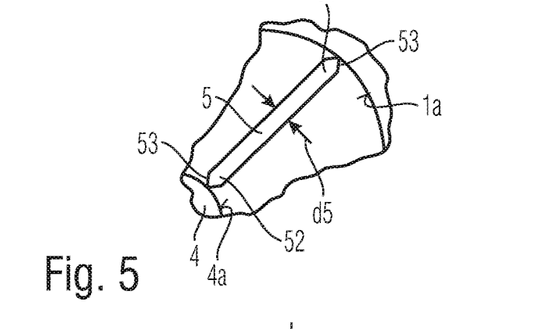
FIG. 5 shows a detailed view of a supporting structure that is formed during a method according to one exemplary embodiment of the disclosure herein.

As illustrated schematically in FIG. 5, the supporting elements or supporting structures 5 can be designed with notches 53 in a first end segment 51 connected to the interior surface 1a of the component 1. The diameter d5 of the respective supporting structure 5 is locally reduced by the notches 53. These notches 53 serve as predetermined breaking points of the supporting structure 5. Alternatively or in addition, notches 53, which also serve as predetermined breaking points, can also be designed in a second end segment 52 of the supporting structures 5 that is in contact with the auxiliary electrode 4.

As is illustrated by way of example in FIGS. 3 and 4, a plurality of supporting elements spaced along the circumference of the auxiliary electrode 4 can be designed at one location with reference to the longitudinal extension of the auxiliary electrode 4. FIG. 4 illustrates by way of example that a total of four supporting elements 5 are provided, which are arranged, spaced apart from one another, at an angle α of 90 degrees to one another. More or fewer than four supporting elements 5 can, of course, also be provided. As can be seen in FIG. 3, the supporting elements 5 are preferably arranged in the region of the opening 31 of the cavity 30, for example at a predetermined distance a31. The predetermined distance a31 can, for example, lie in a range between 1 percent and 200 percent of a diameter d31 of the opening.

After the construction of the component 1, the auxiliary electrode 4 and the supporting structures 5, an electrical insulation of the auxiliary electrode 4 from the interior surface 1a is created through mechanically cutting through the supporting structures 5. The supporting structures 5 can, in particular, be separated from the interior surface 1a of the component 1 or the circumferential surface 4a of the auxiliary electrode 4. The separation can, for example, be carried out by a separating tool 100, as is illustrated by way of example in FIGS. 6 and 8. The separating tool 100 is illustrated by way of example in FIGS. 7, 9 and 10, and is explained below in detail.

Figure 7:
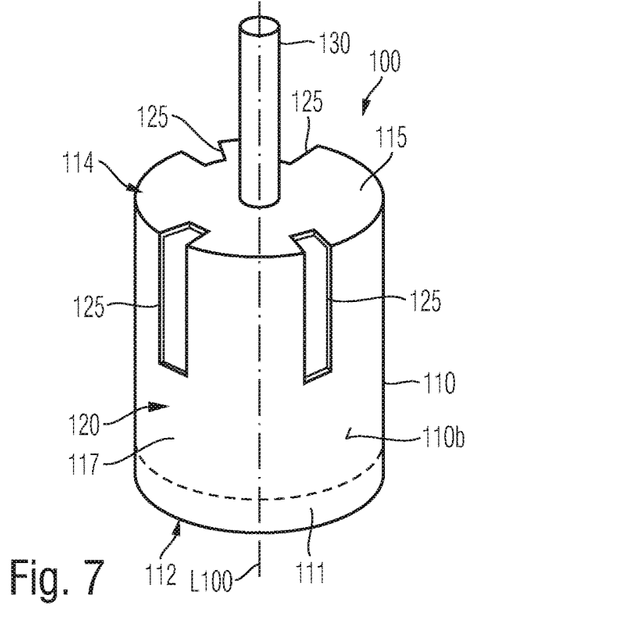
FIG. 7 shows a schematic perspective view of a separating tool according to one exemplary embodiment of the disclosure herein.
Figure 9:
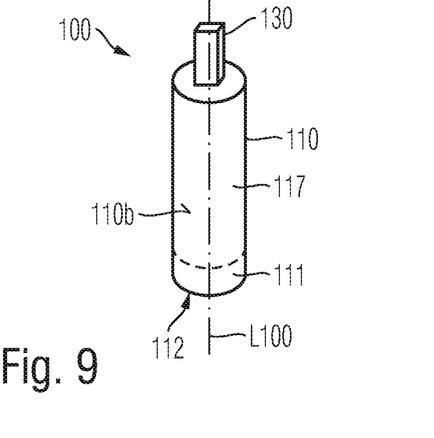
FIG. 9 shows a schematic perspective view of a separating tool according to one further exemplary embodiment of the disclosure herein.
Figure 10:
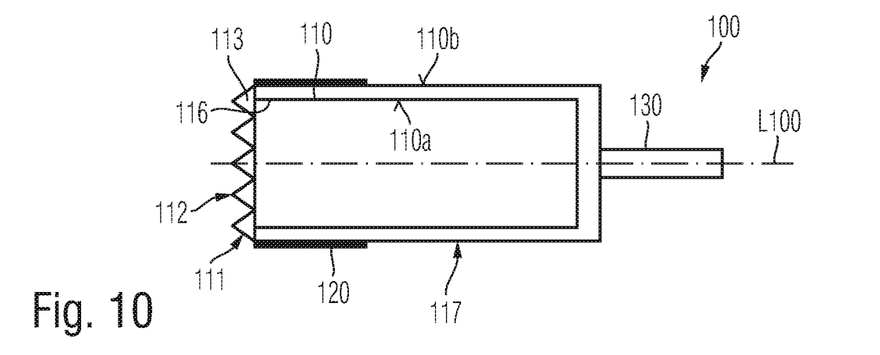
FIG. 10 shows a schematic sectional view of a separating tool according to one further exemplary embodiment of the disclosure herein.

The separating tool 100 illustrated by way of example in FIGS. 7, 9 and 10 comprises a separating head 110 and an optional coupling 130 mechanically connecting the separating tool 100 to a drive apparatus (not illustrated).

As can be seen in FIGS. 7, 9 and 10, the separating head 110 is realized as a sleeve-shaped or cylindrical body which has an interior circumferential surface 110a and, oriented opposite to this, an exterior circumferential surface 110b. The interior circumferential surface 110a defines and encloses a longitudinal axis L100. The cutting head 110 extends along the longitudinal axis L100 between a first, front end 112 and a second, rear end 114 located opposite this. An end plate 115 can, in particular, be provided at the rear end 114. At the front end 112, the cutting head 110 has an opening 116 defined by the interior circumferential surface 110a, as can in particular be seen in FIG. 10. A separating segment 111 is, further, formed at the front end 112 of the separating head 110, and is configured to cut through the supporting elements 5. The separating segment 111 can, optionally, be formed of a metal material, for example of a steel or a titanium alloy. The separating segment 111 can, optionally, comprise a separating structure 113, for example in the form of sawteeth, as is illustrated schematically in FIG. 10. Cutting burrs or the like are also conceivable as separating structures 113. In FIGS. 7 and 9 the separating segment 111 is symbolically set apart visually from a main segment 117, adjacent to it with reference to the longitudinal axis L100, by a dashed line. In general, the separating segment 111 forms a front end 112 of the separating head 110.

As is illustrated in FIG. 7 by way of example, the separating head 110 can comprise one or a plurality of passage openings 125. A separating head 110 with four passage openings 125 is illustrated by way of example in FIG. 7. More or fewer than four passage openings 125 can, of course, also be provided. The passage openings 125 are formed in the region of the rear end 114 of the separating head 110, and can in particular extend along the longitudinal axis L100 in the form of longitudinal elongated recesses, as is illustrated in FIG. 7. As is further shown in FIG. 7, it can optionally be provided that the passage openings 125 extend into the end plate 115.

The optional coupling 130 can, in particular, be designed as a shaft or spigot, which is connected to the rear end 114 of the separating head 110, for example with the end plate 115. A coupling 130 in the form of a shaft with a circular cross-section is illustrated by way of example in FIG. 7, and is arranged coaxially with the longitudinal axis L100 and protrudes from the end plate 115. In FIG. 9 the coupling is arranged in the same way as in FIG. 7, but is designed with a rectangular cross-section.

The separating head 110 comprises an electrically insulating material 120, for example a plastic material such as a polymer, at the interior circumferential surface 110a and/or at the exterior circumferential surface 110b. The interior circumferential surface 110a and/or the exterior circumferential surface 110b can in particular be formed entirely or partially of an electrically insulating material 120. In FIG. 7 it can, for example, be provided that the interior circumferential surface 110a and/or the exterior circumferential surface 110b around the entire circumference and, with reference to the longitudinal axis L100, over the entire main segment 117, i.e. between the rear end 114 and the beginning of the separating section 111 that is symbolized by the dashed line, is formed of an electrically insulating material 120. This is illustrated symbolically in the sectional view of FIG. 6. It is also conceivable that the interior circumferential surface 110a and/or the exterior circumferential surface 110b is only formed of an electrically insulating material 120 in the region of the front end 112 with reference to the longitudinal axis L100, for example in the separating segment 111, and in an end region of the main segment 117 that is adjacent to that, as is illustrated schematically in the sectional views of FIGS. 8 and 10. In general, the interior circumferential surface 110a and/or the exterior circumferential surface 110b of the separating head 110 is, with reference to the longitudinal axis L100, at least in segments formed of an electrically insulating material 120.

Figure 6:
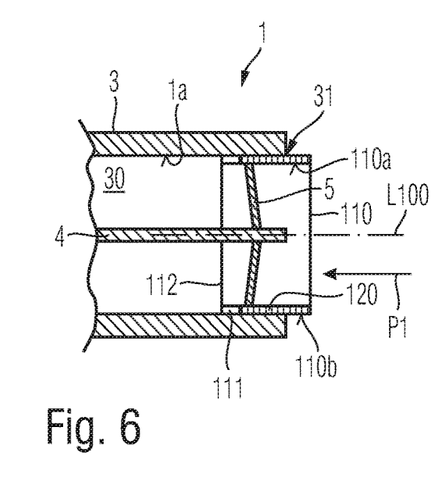
FIG. 6 shows a discontinued sectional view of the component when cutting through a supporting structure in a method according to one exemplary embodiment of the disclosure herein.
Figure 8:
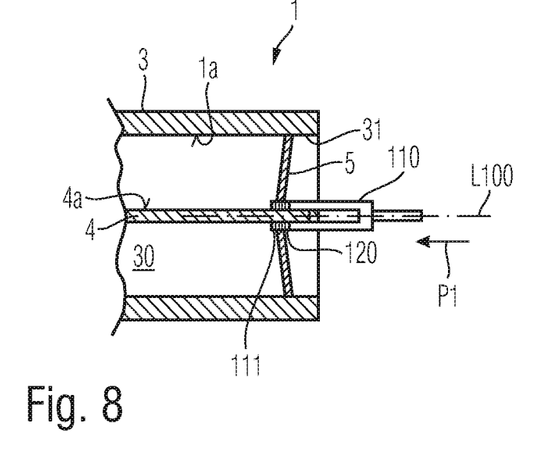
FIG. 8 shows a discontinuous sectional view of the component when cutting through a supporting structure in method according to one further exemplary embodiment of the disclosure herein.

In FIGS. 6 and 8, each of which represents a sectional view of the separating head 110 illustrated in FIG. 7 or 9 in use for separating the supporting elements 5, the hatching of the separating head 110 in the main segment 117 illustrates by way of example that the separating head 110 can be itself at least in segments with reference to the longitudinal axis L100 formed of the electrically insulating material 120. The separating head 110 can, for example, be formed of a moulded plastic part. The interior circumferential surface 110a and/or the exterior circumferential surface 110b of the separating head 110 are thus formed of an electrically insulating material 120. FIG. 10 shows schematically, and purely by way of example, a further possibility for designing the interior circumferential surface 110a and/or the exterior circumferential surface 110b to be electrically insulating. FIG. 10 shows schematically that the exterior circumferential surface 110b in the end region of the main segment 117 that is adjacent to the separating segment 111 is provided with a coating of an electrically insulating material 120. The interior circumferential surface 110a can of course, alternatively or in addition, also be provided with such a coating.

FIGS. 6 and 8 show, by way of example, a separation of the supporting structures or supporting elements 5 for electrically insulating the auxiliary electrode 4 from the interior surface 1a of the component 1 with the aid of the separating tool 100 described above. As is suggested in FIGS. 6 and 8 by the arrow P1, the separating head 110 with the separating segment 111 is inserted in advance into the opening 31 of the cavity 30, and moved along the auxiliary electrode 4 into the interior of the cavity 30, or in the direction of the supporting elements 5. As a result the separating segment 111, or the front end 112 of the separating head 110, comes to lie against the supporting elements 5. Through further movement of the separating head 110 along the auxiliary electrode 4 against the supporting elements 5, optionally combined with a rotation of the separating head 110 about the longitudinal axis L100, the supporting elements 5 are mechanically cut through by the separating head 110, in particular by the separating segment 111. It can, for example, be provided that the separating segment 111 cuts through the supporting elements 5 by the optional separating structure 113. It can also be provided that the separating segment 111 exerts a mechanical stress on the supporting elements 5 that is large enough for the supporting elements 5 to break, e.g. at one of the predetermined breaking points formed by the optional notches 53 (FIG. 5).

As is further illustrated schematically in FIGS. 6 and 8, the separating head 110 can be inserted into the opening 31 or moved into the cavity 30 after the cutting through of the supporting elements 5 further along the auxiliary electrode 4, in particular sufficiently far that the supporting elements 5 are adjacent to the electrically insulating material 120 of the interior circumferential surface 110a or of the exterior circumferential surface 110b. The supporting elements 5 are thereby separated physically from the interior surface 1a of the component 1 or of the auxiliary electrode 4, and the electrical insulation is improved through the electrical insulation material 120 of the separating head 110.

FIG. 6 illustrates by way of example that an exterior diameter of the separating head 110 defined by the exterior circumferential surface 110b corresponds to the diameter d31 of the opening 31 of the cavity 30 defined by the interior surface 1a. To separate the supporting structures 5 from the interior surface 1a the separating head 110 is moved into the cavity 30 with the exterior circumferential surface 110b adjacent to the interior surface 1a of the component 1. The supporting structures 5 at the interior surface 1a of the component 1 are thereby cut through, e.g. broken through at the optional notches 53 at the first end segment 51 of the supporting structures 5. To ensure that the supporting structures 5 are cut through at the interior surface 1a of the component 1 and not at the auxiliary electrode 4, it can, for example, be provided that notches 53 are only provided in the first end segment 51 of the supporting structures 5, or that the supporting structures 5 in the first end segment 51 are notched more deeply or, in general, more markedly weakened, than in the second end segment 52.

Through the movement of the separating head 110 further into the cavity 30, the supporting elements 5 are placed against the interior circumferential surface 110a of the separating head 110. The separating head 110 is moved on until the supporting elements 5 lie with their second end segment 52 at the electrically insulating material 120 of the interior circumferential surface 110a. When the supporting elements 5 are broken through, as described above, they are bent in the movement direction P1 of the separating head 110, and are thereby tensioned against the interior circumferential surface 110a as a result of their elasticity. As can clearly be seen in FIG. 6, the supporting structures 5, assuming they are provided with at least two supporting structures 5 spaced along a circumference of the auxiliary electrode 4, can support the auxiliary electrode 4 against the separating head 110, so that the auxiliary electrode 4 can be held at a predetermined distance a4 from the interior surface 1a of the component 1 after the separation of the supporting structures 5 by the separating head 110.

FIG. 8 illustrates by way of example that an interior diameter of the separating head 110 defined by the interior circumferential surface 110a corresponds to the diameter d4 of the auxiliary electrode 4 defined by the circumferential surface 4a. To separate the supporting elements 5 from the auxiliary electrode 4, the separating head 110 is moved into the opening 31 of the cavity 30, and the auxiliary electrode 4 is inserted into the separating head 110, so that the interior circumferential surface 110a of the separating head 110 lies against the circumferential surface 4a of the auxiliary electrode 4. By moving the separating head 110 along the auxiliary electrode 4 into the cavity 30, the supporting structures 5 are cut through at the circumferential surface 4a of the auxiliary electrode 4, for example at the optional notches 53 in the second end segment 52 of the supporting structures 5. To ensure that the supporting structures 5 are cut through at the circumferential surface 4a of the auxiliary electrode 4 and not at the interior surface 1a of the component 1, it can, for example, be provided that notches 53 are only provided in the second end segment 52 of the supporting structures 5, or that the supporting structures 5 in the second end segment 52 are notched more deeply or, in general, more markedly weakened, than in the first end segment 51.

Through the movement of the separating head 110 further into the cavity 30, the supporting elements 5 are placed against the exterior circumferential surface 110b of the separating head 110. The separating head 110 is moved on until the supporting elements 5 lie with their second end segment 52 at the electrically insulating material 120 of the exterior circumferential surface 110b. When the supporting elements 5 are broken through, as described above, they are bent in the movement direction P1 of the separating head 110, and are thereby tensioned against the exterior circumferential surface 110b as a result of their elasticity. As can clearly be seen in FIG. 8, the supporting structures 5, assuming they are provided with at least two supporting structures 5 spaced along a circumference of the auxiliary electrode 4, can support the auxiliary electrode 4 against the separating head 110, so that the auxiliary electrode 4 can be held at a predetermined distance a4 from the interior surface 1a of the component 1 after the separation of the supporting structures 5 by the separating head 110.

Figure 11:
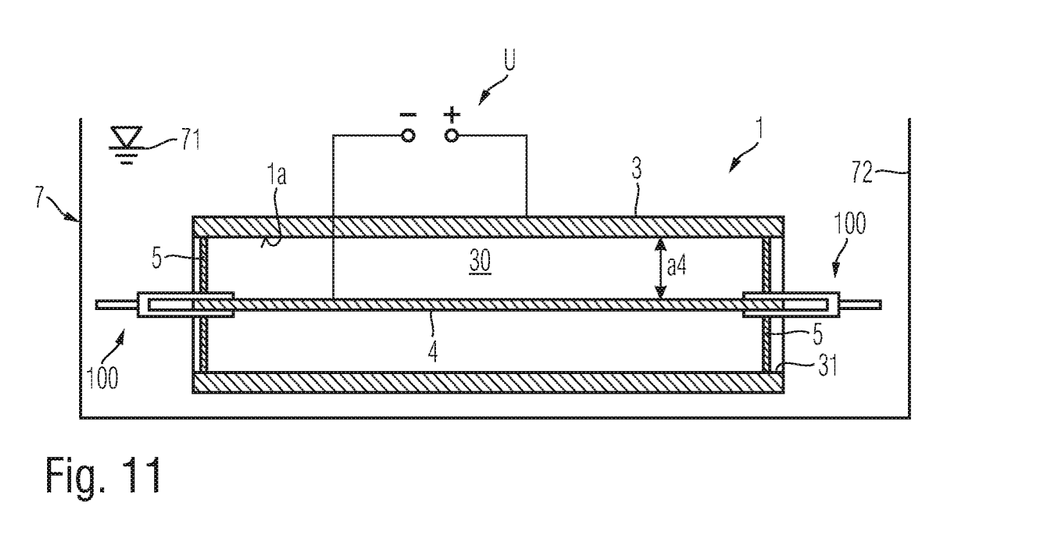
FIG. 11 shows a step of an electro-polishing of the component in a method according to one exemplary embodiment of the disclosure herein.

FIG. 11 schematically shows an electro-polishing of the interior surface 1a of the component 1. After the additive manufacture of the component 1, the auxiliary electrode 4 and the supporting elements 5, and the cutting through of the supporting elements 5, the auxiliary electrode 4 can be used as the cathode for the electro-polishing. The component 1, with the auxiliary electrode 4 arranged therein, is arranged for this purpose in an electrolyte bath 7, i.e. in a container 72 filled with electrolytic liquid 71, as is illustrated schematically in FIG. 11. The auxiliary electrode 4 can here for example be held, as shown in FIG. 11, by the separating head 110 which is in turn supported by the supporting elements 5. FIG. 11 shows by way of example that the separating head 110, as shown in FIG. 8, lies with the interior circumferential surface 110a against the circumferential surface 4a of the auxiliary electrode 4. It is, of course, also conceivable that the separating head 110, as shown in FIG. 6, lies with the exterior circumferential surface 110b against the interior surface 1a of the component. In this case, the optional passage openings 125 are advantageous, since they assist the flow of electrolytic fluid 71 in the cavity 30 through the opening 31.

To perform the electro-polishing, the auxiliary electrode 4 is connected to different poles (+, −) of an electric voltage source U in such a way that the auxiliary electrode 4 forms a cathode and the component 1 forms an anode. The electric voltage source U can, in particular, be a direct voltage source. During the electro-polishing, an anodic removal of metal material 2 takes place at the interior surface 1a of the component 1, whereby this is smoothed. Through the formation of the auxiliary electrode 4 during the additive manufacture of the component 1, the auxiliary electrode 4 can be placed in cavities 30 of the component 1 in a simple manner. The auxiliary electrode 4 can in particular be positioned very precisely at a predetermined distance a4 from the interior surface 1a which simplifies the electro-polishing and improves the surface quality of the interior surface 1a that is achieved. Through the separation of the supporting elements 5 by the separating head 110, the precise positioning of the auxiliary electrode 4 can be maintained for the electro-polishing in a simple manner.

After the electro-polishing, the auxiliary electrode 4 can be removed from the cavity 30 of the cavity segment 3, for example by withdrawing using a suitable tool, e.g. with tongs (not illustrated). If the component 1 is designed with a plurality of mutually connected cavity segments 3, e.g. as this is illustrated in FIGS. 1 and 12, the auxiliary electrodes 4 can be separated from one another at the optional notch 45 in a simple manner when removing from the cavities 30. For example, a torsional or bending stress can be applied to the individual electrodes 4 in order to achieve a fracture at the respective notch 45. The electrode 4, separated from the remaining auxiliary electrodes 4, can then be withdrawn through the opening 31 out of the respective cavity 30.

Although the disclosure herein has been explained above by way of example with reference to exemplary embodiments, it is not restricted to these, but can be modified in a versatile manner. Combinations of the exemplary embodiments above are, in particular, also conceivable.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 Component
1a Interior surface
2 Metal material
3 Cavity segment
4 Auxiliary electrode
4a Circumferential surface of the auxiliary electrode
5 Supporting structure
7 Electrolyte bath
10 Tube segments
11 Walls
30 Cavity
31 Opening of the cavity
40 Connecting region of the auxiliary electrodes
45 Notches of the auxiliary electrodes
51 First end segment of the supporting structure
52 Second end segment of the supporting structure
53 Notch
71 Electrolytic fluid
72 Container
100 Separating tool
110 Separating head
110a Interior circumferential surface of the separating head
110b Exterior circumferential surface of the separating head
111 Separating segment
112 Front end of the separating head
113 Separating structure
114 Rear end of the separating head
115 End plate
116 Opening
117 Main segment
120 Electrically insulating material
125 Passage opening
130 Coupling
200 3D printing apparatus
211 Computer
213 Laser beam
214 Mirror
215 Powder feed
216 Working platform
217 Working chamber
218 Lowering piston
219 Lasers
α Angle
a4 Distance of the auxiliary electrode from the interior surface
a31 Distance of the supporting structure from the opening
d4 Diameter of the auxiliary electrode
L100 Longitudinal axis
U Voltage source

The invention claimed is:

1. A method for manufacture of a component, the method comprising:
constructing the component from a metal material in an additive manufacturing method with at least one cavity segment that has a cavity open on at least one side and is defined by an interior surface of the component;
forming an auxiliary electrode during construction of the component;
forming one or a plurality of supporting structures that connect the auxiliary electrode to the interior surface of the component during the construction of the component;
electrically insulating the auxiliary electrode from the interior surface by separating the one or plurality of supporting structures from the interior surface or from the auxiliary electrode;
performing an electro-polishing of the interior surface in an electrolyte bath by connecting the component and the auxiliary electrode to different poles of an electric voltage source such that the auxiliary electrode forms a cathode and the component forms an anode;
inserting a separating head of a separating tool into an opening, defined by the interior surface of the component, of the cavity along the auxiliary electrode, wherein the separating head has an interior circumferential surface that defines and encloses a longitudinal axis and an exterior circumferential surface that is oriented opposite to the interior circumferential surface; and
cutting through the one or plurality of supporting structures with a separating segment of the separating head which, with reference to the longitudinal axis, forms a front end of the separating head, wherein the separating head is inserted into the opening sufficiently far that the one or plurality of supporting structures lie against an electrically insulating material forming, at least in segments, the interior circumferential surface and/or the exterior circumferential surface with reference to the longitudinal axis.

2. The method according to claim 1, wherein:
the one or plurality of supporting structures comprises at least two supporting structures spaced apart along a circumference of the auxiliary electrode;
the exterior circumferential surface of the separating head lies against the interior surface of the component when separating the at least two supporting structures; and
the separating head remains arranged in the cavity during the electro-polishing.

3. The method according to claim 1, wherein:
the interior circumferential surface of the separating head lies against a circumferential surface of the auxiliary electrode when separating the one or plurality of supporting structures; and
the separating head remains arranged in the cavity during the electro-polishing.

4. The method according to claim 1, comprising rotating the separating head about the longitudinal axis during separation of the one or plurality of supporting structures.

5. The method according to claim 1, wherein the one or plurality of supporting structures are formed in a first end segment that is connected to the interior surface of the component and/or in a second end segment that is connected to the auxiliary electrode and are formed with predetermined breaking points for separating the one or plurality of supporting structures from the interior surface and/or the auxiliary electrode.

6. The method according to claim 1, additionally comprising removing the auxiliary electrode from the cavity of the cavity segment.

7. The method according to claim 6, wherein the component is constructed with a first cavity segment and a second cavity segment connected to this, wherein the auxiliary electrodes of the first and of the cavity segment are designed as one piece and with a predetermined breaking point in a connecting region of the auxiliary electrodes, and wherein the auxiliary electrodes are separated from one another on removal from the cavities of the cavity segments at the predetermined breaking point.

8. A separating tool comprising:
a separating head with an interior circumferential surface that defines and encloses a longitudinal axis, an exterior circumferential surface that is oriented opposite to this interior circumferential surface, and a separating segment that forms a front end of the separating head with reference to the longitudinal axis;
wherein the interior circumferential surface and/or the exterior circumferential surface of the separating head is formed, at least in segments, of an electrically insulating material with reference to the longitudinal axis; and
wherein:
the separating segment comprises:
a separating structure; or
a separating structure comprising sawteeth or cutting burrs; or
the separating head comprises at least one passage opening for passing through electrolytic fluid in a region of a rear end which, with reference to the longitudinal axis, is located opposite the front end.

9. The separating tool according to claim 8, wherein the separating head is, at least in segments with reference to the longitudinal axis, formed of the electrically insulating material.

10. The separating tool according to claim 8, wherein the interior circumferential surface and/or the exterior circumferential surface is coated with the electrically insulating material at least in segments with reference to the longitudinal axis.

11. The separating tool according to claim 8, wherein the at least one passage opening extends along the longitudinal axis and optionally extends into an end plate forming the rear end of the separating head.

12. The separating tool according to claim 8, comprising a coupling for mechanically connecting the separating tool to a drive apparatus, wherein the coupling is connected to a rear end of the separating head which, with reference to the longitudinal axis, is located opposite to the front end.

13. A separating tool comprising:
a separating head with an interior circumferential surface that defines and encloses a longitudinal axis, an exterior circumferential surface that is oriented opposite to the interior circumferential surface, and a separating segment that forms a front end of the separating head with reference to the longitudinal axis; and
a coupling for mechanically connecting the separating tool to a drive apparatus, wherein the coupling is connected to a rear end of the separating head which, with reference to the longitudinal axis, is located opposite to the front end;
wherein the interior circumferential surface and/or the exterior circumferential surface of the separating head is formed, at least in segments, of an electrically insulating material with reference to the longitudinal axis.

14. The separating tool according to claim 13, wherein the separating head is, at least in segments with reference to the longitudinal axis, formed of the electrically insulating material.

15. The separating tool according to claim 13, wherein the interior circumferential surface and/or the exterior circumferential surface is coated with the electrically insulating material at least in segments with reference to the longitudinal axis.

16. The separating tool according to claim 13, wherein the separating segment comprises:
a separating structure; or
a separating structure comprising sawteeth or cutting burrs.

17. The separating tool according to claim 13, wherein the separating segment comprises at least one passage opening for passing through electrolytic fluid in a region of a rear end which, with reference to the longitudinal axis, is located opposite the front end.

18. The separating tool according to claim 17, wherein the at least one passage opening extends along the longitudinal axis and optionally extends into an end plate forming the rear end of the separating head.

* * * * *